US008824473B2

(12) United States Patent
Xie

(10) Patent No.: US 8,824,473 B2
(45) Date of Patent: Sep. 2, 2014

(54) APPARATUS AND METHOD FOR PSEUDO WIRE EMULATION EDGE-TO-EDGE ACCESS

(75) Inventor: Mi Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 263 days.

(21) Appl. No.: 13/258,389

(22) PCT Filed: Sep. 19, 2010

(86) PCT No.: PCT/CN2010/077093
§ 371 (c)(1),
(2), (4) Date: May 4, 2012

(87) PCT Pub. No.: WO2011/057520
PCT Pub. Date: May 19, 2011

(65) Prior Publication Data
US 2012/0219016 A1 Aug. 30, 2012

(30) Foreign Application Priority Data

Nov. 16, 2009 (CN) .......................... 2009 1 0180179

(51) Int. Cl.
*H04L 12/28* (2006.01)
*H04L 12/46* (2006.01)
(52) U.S. Cl.
CPC ........ *H04L 12/4633* (2013.01); *H04L 12/4641* (2013.01); *H04L 12/4654* (2013.01); *H04L 12/4658* (2013.01); *H04L 12/4666* (2013.01)
USPC ........................................................ 370/392
(58) Field of Classification Search
CPC ..... H04L 12/4633; H04L 45/68; H04L 45/50; H04L 12/4641; H04L 12/4658
See application file for complete search history.

(56) References Cited

U.S. PATENT DOCUMENTS

| 7,756,125 B2 | 7/2010 | Sinicrope et al. |
| 2005/0129059 A1 | 6/2005 | Jiang et al. |

(Continued)

FOREIGN PATENT DOCUMENTS

| CN | 1625176 A | 6/2005 |
| CN | 1937573 A | 3/2007 |

(Continued)

OTHER PUBLICATIONS

Supplementary European Search Report in European application number: 10829484.4, mailed on Jul. 3, 2013.

(Continued)

*Primary Examiner* — Jung Park
(74) *Attorney, Agent, or Firm* — Oppedahl Patent Law Firm LLC

(57) ABSTRACT

The present disclosure provides an apparatus and a method for PWE3 access. The method includes: after receiving non-Ethernet data transmitted by a local user, a local PE performs inner layer PWE3 frame format encapsulation and an outer layer L2VPN frame format encapsulation on the non-Ethernet data in sequence, and then transmits the encapsulated data to an opposite PE; after receiving the data transmitted by the opposite PE, the local PE performs an outer layer L2VPN frame format de-encapsulation and an inner layer PWE3 frame format de-encapsulation on the date in sequence, and then transmits, to the local user, the non-Ethernet data obtained after the two de-encapsulations. The present disclosure can implement the pseudo wire emulation edge-to-edge access for non-Ethernet with saving label space of the PE, and can avoid multiple exchanges of Pseudo Wire (PW) labels.

10 Claims, 4 Drawing Sheets

(56) References Cited

U.S. PATENT DOCUMENTS

| | | |
|---|---|---|
| 2005/0190757 A1* | 9/2005 | Sajassi ............................ 370/389 |
| 2006/0182113 A1* | 8/2006 | Liang et al. ................. 370/395.3 |
| 2007/0030851 A1 | 2/2007 | Sinicrope et al. |
| 2007/0280267 A1 | 12/2007 | Ould-Brahim |
| 2008/0172497 A1 | 7/2008 | Mohan et al. |
| 2009/0168783 A1 | 7/2009 | Mohan et al. |
| 2009/0225755 A1* | 9/2009 | Wu et al. ......................... 370/392 |
| 2009/0274156 A1* | 11/2009 | Emmendorfer et al. . 370/395.53 |
| 2011/0216772 A1 | 9/2011 | Mohan et al. |
| 2013/0235875 A1* | 9/2013 | Mohan et al. ............ 370/395.53 |

FOREIGN PATENT DOCUMENTS

| | | | |
|---|---|---|---|
| CN | 101714937 A | 5/2010 | |
| JP | 2006129359 A | 5/2006 | |
| RU | 2321959 C2 | 4/2008 | |
| WO | 2007101140 A2 | 9/2007 | |

OTHER PUBLICATIONS

A Study about bandwidth efficiency of emulating a leased line by PWE3 Mar. 2003.

International Search Report in international application number: PCT/CN2010/077093, mailed on Dec. 30, 2010.

English Translation of the Written Opinion of the International Search Authority in international application No. PCT/CN2010/077093, mailed on Dec. 30, 2010.

* cited by examiner

Fig. 6

| Load | PW label2 | Tunnel label2 | 8847 | VLAN2 | 8100 | SA2 | DA2 |

| Cell | PW label1 | Tunnel label1 | 8847 | VLAN1 | 8100 | SA1 | DA1 |

(a)

| Cell | PW label1 | Tunnel label1 | 8847 | VLAN1 | 8100 | SA1 | DA1 |

(b)

| Cell |

(c)

APPARATUS AND METHOD FOR PSEUDO WIRE EMULATION EDGE-TO-EDGE ACCESS

TECHNICAL FIELD

The present disclosure relates to the technology of Pseudo Wire Emulation Edge-to-Edge (PWE3) in the field of communications, in particular to an apparatus and a method for pseudo wire emulation edge-to-edge access.

BACKGROUND

PWE3 is a mechanism that simulates various point-to-point services on Packet Switched Network (PSN); the simulated services may be various networks such as Time Division Multiplex (TDM) private wire network, Asynchronous Transmission Mode (ATM) network, Frame Relay (FR) network or Ethernet. PWE3 utilizes tunnel mechanism on the PSN to simulate required attributes of the services; wherein the tunnel is called as Pseudo Wire (PW). A provider can utilize PWE3 to transfer all transmission services to a converged network, here the converged network may be IP is network or Multiple Protocol Label Switching (MPLS) network and the like. For users, the required attributes simulated by PWE3 can be considered as a dedicated link or circuit.

FIG. 1 shows a structure diagram of a service reference model of PWE3 on the PSN, which is proposed by Internet Engineering Task Force (IETF. As shown in FIG. 1, PE1 and PE2 are provider edge devices, CE1 and CE2 are customer edge devices, one or more PWs, namely PWE3 channels, are established between the PE1 and the PE2, Access Links (AC) are established between the CE and the PE, and the AC may be Ethernet and may also be non-Ethernet, such as the ATM network. After the CE1 and the CE2 are accessed to the PE1 and the PE2 through the AC respectively, communication between the CE1 and the CE2 is implemented through the PW. PW is borne on a PSN tunnel, and the PSN tunnel determines the data forwarding path. One PSN tunnel can bear multiple PWs. When communication is implemented between the CE1 and the CE2, the user data of CE1 is first encapsulated with a PW label after the user data is transmitted to the PE1, and then encapsulated with a tunnel label and Medium Access Control (MAC) address to form a data message. The data message is transmitted to the PE2 through a path established by the PW, and the PE2 de-encapsulates the received data message and takes out the PW label to determine an exit circuit; the user data obtained by the de-encapsulation is transmitted to the CE2. The model shown in FIG. 1 is a reference model of PWE3 in practical application, which can implement pseudo wire emulation edge-to-edge access for Ethernet or non-Ethernet; the basic principle of the model is universally applicable for practical application, the specific application modes of the model are different when the specific service demands are different.

At present, the method for pseudo wire emulation edge-to-edge access for non-Ethernet is that the PWE3 services are implemented by exchanges of multiple PWs, namely, PW encapsulation is performed on local user data before the local user data is is transmitted to the local PE, the PW label in the PW encapsulation is assigned by the local PE, wherein the PW is only the PW between the local user and the local PE; the local PE uses the PW label assigned by the opposite PE to replace the PW label in the data after receiving the data, wherein the PW is the PW between the local PE and the opposite PE and is used to transmit the data at the local PE to the opposite PE; after receiving the data, the opposite PE also needs to replace the PW label again to transmit the data to the opposite user. Here, the local PE or the opposite PE needs to assign different PW labels for different users, if the local PE or the opposite PE corresponds to multiple users, the PW labels of the multiple users will occupy a large amount of label space of the PE.

SUMMARY

In view of this, the main purpose of the present disclosure is to provide an apparatus and a method for pseudo wire emulation edge-to-edge access, which can implement the pseudo wire emulation edge-to-edge access for non-Ethernet with saving the label space of the PE, and can avoid multiple exchanges of PW labels.

In order to achieve the purpose, the technical solution of the present disclosure is implemented as follows.

The present disclosure provides an apparatus for pseudo wire emulation edge-to-edge access, which includes: an emulation processing module and a data processing module; wherein the emulation processing module is configured to, after receiving non-Ethernet data transmitted by a local user, perform an inner layer PWE3 frame format encapsulation on the non-Ethernet data, and to transmit the encapsulated data to the data processing module; the emulation processing module is further configured to perform an inner layer PWE3 frame format de-encapsulation on data which is transmitted by the data processing module and which has been subjected to an outer layer L2VPN frame format de-encapsulation, and to transmit the de-encapsulated non-Ethernet data to the local user;

the data processing module is configured to perform the outer layer L2VPN frame is format encapsulation on the data which is transmitted by the emulation processing module and which has been subjected to the inner layer PWE3 frame format encapsulation, and to transmit the encapsulated data to an opposite Provider Edge device (PE); the data processing module is further configured to, after receiving the data transmitted by the opposite PE, perform the outer layer L2VPN frame format de-encapsulation on the data, and to transmit the de-encapsulated data to the emulation processing module.

The data processing module may further include: a Layer 2 Virtual Ethernet Interface (L2VE) module, configured to implement communication between the data processing module and the emulation processing module, through which the data processing module transmits data to the emulation processing module and receives data transmitted by the emulation processing module.

The data processing module may further include: a Pseudo Wire Emulation Edge-to-Edge Virtual Ethernet Interface (PWE3 VE) module, configured to implement communication between the emulation processing module and the data processing module, through which the emulation processing module transmits data to the data processing module and receives data transmitted by the data processing module.

The emulation processing module may include one or more PWE3 VE modules; correspondingly, the data processing module may include one or more L2VE modules, which have a one-to-one relationship with the PWE3 VE modules.

The present disclosure also provides a method for pseudo wire emulation edge-to-edge access, which includes:

after receiving non-Ethernet data transmitted by a local user, a local PE performs an inner layer PWE3 frame format encapsulation and an outer layer L2VPN frame format encapsulation on the non-Ethernet data in sequence, and then transmits the encapsulated data to an opposite PE;

after receiving data transmitted by the opposite PE, the local PE performs an outer layer L2VPN frame format de-encapsulation and an inner layer PWE3 frame format de-encapsulation on the date in sequence, and then transmits, to the local user, the non-Ethernet data obtained through the two de-encapsulations.

The local PE performing the inner layer PWE3 frame format encapsulation may include:

after receiving the non-Ethernet data transmitted by the local user, an emulation processing module in the local PE performs a Pseudo Wire (PW) encapsulation and a PWE3 tunnel encapsulation and a Virtual Local Area Network (VLAN) encapsulation on the received non-Ethernet data in sequence, makes a destination MAC address and a source MAC address encapsulated in the data, and then transmits the encapsulated data to a data processing module in the local PE through a PWE3 VE module in the emulation processing module, wherein the data processing module receives data through an L2VE module configured by itself.

The destination MAC address may be a MAC address of a Customer Edge device (CE) at the opposite end; the source MAC address may be a MAC address of a local Customer Edge device (CE).

Performing the outer layer L2VPN frame format encapsulation on the non-Ethernet data which has been subjected to inner layer PWE3 frame format encapsulation may include:

after receiving the encapsulated data transmitted by the emulation processing module, the data processing module in the local PE performs a PW encapsulation and an L2VPN tunnel encapsulation and a VLAN encapsulation in sequence, and making a destination MAC address and a source MAC address encapsulated in the data.

The destination MAC address may be a MAC address of the opposite PE; the source MAC address may be a MAC address of the local PE.

According to the apparatus and the method for pseudo wire emulation edge-to-edge access provided by the present disclosure, after receiving non-Ethernet data transmitted by the local user, the local PE performs the inner layer PWE3 frame format encapsulation and the outer layer L2VPN frame format encapsulation on the received non-Ethernet data in sequence and then transmits the encapsulated data to the opposite is PE; after receiving data transmitted by the opposite PE, the local PE performs the outer layer L2VPN frame format de-encapsulation and the inner layer PWE3 frame format de-encapsulation on the date in sequence, and then transmits, to the local user, the non-Ethernet data obtained through the two de-encapsulations. In the present disclosure, the local user and the opposite user have established a PWE3 connection relation between each other in a transparent channel provided by the L2VPN; for multiple groups of different users, the same L2VPN channel is used to transmit data between PEs at two ends, therefore PWs in the outer layer L2VPN frame format encapsulation have a same value, thus avoiding multiple exchanges of PW labels in the prior art, and further saving a large amount of label space of the PE.

BRIEF DESCRIPTION OF THE DRAWINGS

FIG. 6 shows a diagram of data structure before and after de-encapsulating downlink data according to the present disclosure.

DETAILED DESCRIPTION

Figure 1:
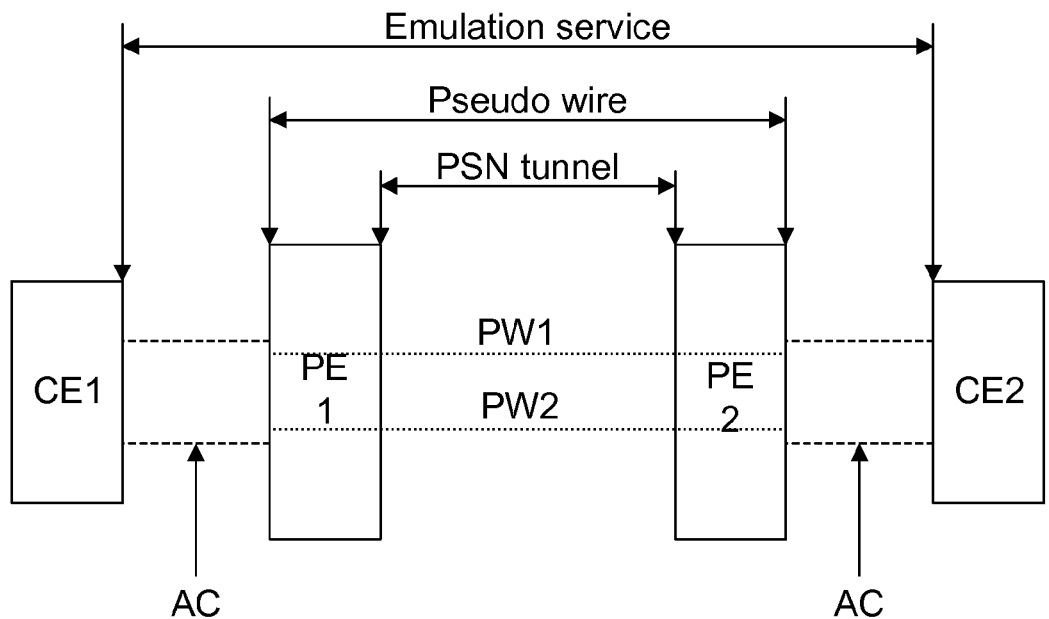
FIG. 1 shows a structure diagram of a service reference model of PWE3 on the PSN.

The apparatus to be illustrated by the present disclosure is a Provider Edge device (PE) as shown in FIG. 1. A main function module in an existing PE is a service forwarding line card that generally includes an interface board, a data processing module and a switching chip, wherein the data processing module may be a network processor and the like. The present disclosure utilizes Layer 2 Virtual Private Network (L2VPN) is technology to bear a PWE3 service, namely, the L2VPN service is configured between the PEs at two ends of a PSN network, the L2VPN may be a Virtual Private LAN Service (VPLS), and an inner layer PWE3 service is borne on an outer layer L2VPN service.

Here, the L2VPN technology has been maturely applied in the process of implementing pseudo wire emulation edge-to-edge access for Ethernet, the present disclosure implements pseudo wire emulation edge-to-edge access for non-Ethernet on the basis of the L2VPN technology, namely, transmitting non-Ethernet data between users at the two ends of the PSN network.

The basic idea of the present disclosure is that: after receiving non-Ethernet data transmitted by a local user, a local PE performs an inner layer PWE3 frame format encapsulation on the non-Ethernet data, then performs an outer layer L2VPN frame format encapsulation on the data which has been subjected to the inner layer PWE3 frame format encapsulation, and then transmits the encapsulated data to an opposite PE;

after receiving data from the opposite PE, the local PE performs an outer layer L2VPN frame format de-encapsulation and an inner layer PWE3 frame format de-encapsulation on the data in turn, and then transmits, to the local user, the non-Ethernet data obtained through the two de-encapsulations.

The present disclosure will be further described in details with reference to drawings and specific embodiments.

Figure 2:
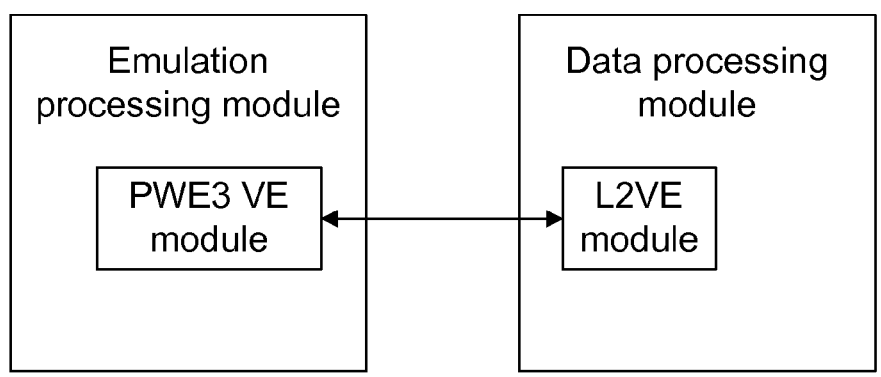
FIG. 2 shows a structure diagram of an apparatus for pseudo wire emulation edge-to-edge access according to the present disclosure.

FIG. 2 shows a structure diagram of an apparatus for pseudo wire emulation edge-to-edge access according to the present disclosure. As shown in FIG. 2, the apparatus includes: an emulation processing module and a data processing module; wherein the emulation processing module is configured to, after receiving non-Ethernet data transmitted by a local user, perform an inner layer PWE3 frame format encapsulation on the non-Ethernet data, and to transmit the encapsulated data to the data processing module; the emulation processing module is further configured to perform an inner layer PWE3 frame format de-encapsulation on the data which is transmitted by the data processing module and which has been subjected to an outer layer L2VPN frame format de-encapsulation, and to transmit the de-encapsulated non-Ethernet data to the local user;

the data processing module is configured to perform an outer layer L2VPN frame format encapsulation on the data which is transmitted by the emulation processing module and which has been subjected to the inner layer PWE3 frame format encapsulation, and to transmit the encapsulated data to the opposite PE; the data processing module is further configured to, after receiving the data transmitted by the opposite PE, perform an outer layer L2VPN frame format de-encapsulation on the data, and to transmit the de-encapsulated data to the emulation processing module.

The data processing module further includes: a Layer 2 Virtual Ethernet Interface (L2VE) module, configured to implement communication between the data processing module and the emulation processing module, through which the data processing module transmits data to the emulation processing module and receives data transmitted by the emulation processing module.

The emulation processing module further includes: a Pseudo Wire Emulation Edge-to-Edge Virtual Ethernet Interface (PWE3 VE) module, configured to implement communication between the data processing module and the emulation processing module, through which the pseudo processing module transmits data to the data processing module and receives data transmitted by the data processing module.

Figure 3:
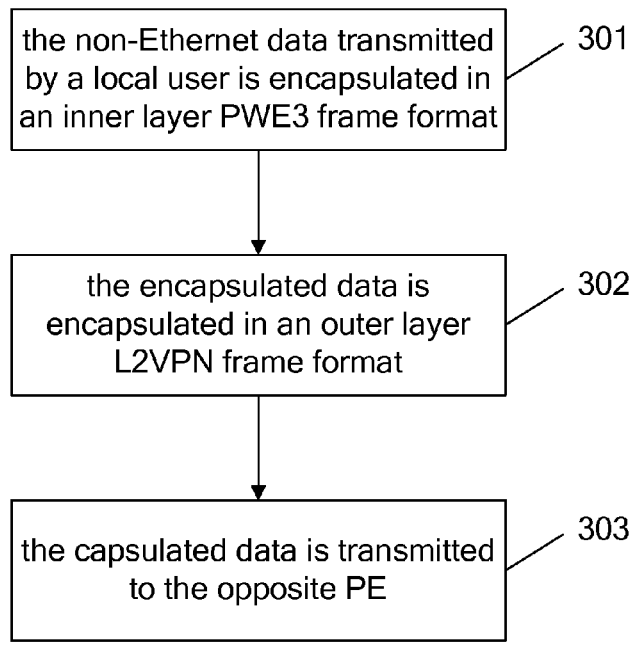
FIG. 3 shows a flow diagram of uplink data forwarding in a method for pseudo wire emulation edge-to-edge access according to the present disclosure.

FIG. 3 shows a flow diagram of uplink data forwarding in a method for pseudo wire emulation edge-to-edge access according to the present disclosure. As shown in FIG. 3, the flow has the following specific implementation steps.

Step 301: the non-Ethernet data transmitted by a local user is encapsulated in an inner layer PWE3 frame format.

Specifically, the non-Ethernet data transmitted by the local user enters the emulation processing module first, the emulation processing module performs PW encapsulation and PWE3 tunnel encapsulation on the received non-Ethernet data first, is then performs VLAN encapsulation on the data, makes a destination MAC address and a source MAC address encapsulated in the data, and transmits the encapsulated data to the data processing module through the PWE3 VE module; the data processing module receives the data through the L2VE module.

Wherein the PW is a PW between the local user and an opposite user; the PWE3 tunnel is an inner layer tunnel that bears the PWE3 service between the local user and the opposite user, and the so-called inner layer tunnel is relative to the outer layer L2VPN tunnel; the VLAN encapsulation means encapsulating a VLAN ID corresponding to the PWE3 VE module; the destination MAC address is a MAC address corresponding to the next hop of the inner layer tunnel that bears the PWE3 service, namely, the MAC address of a Customer Edge device (CE) at the opposite end; the source MAC address is a MAC address of a local Customer Edge device (CE).

Figure 4:
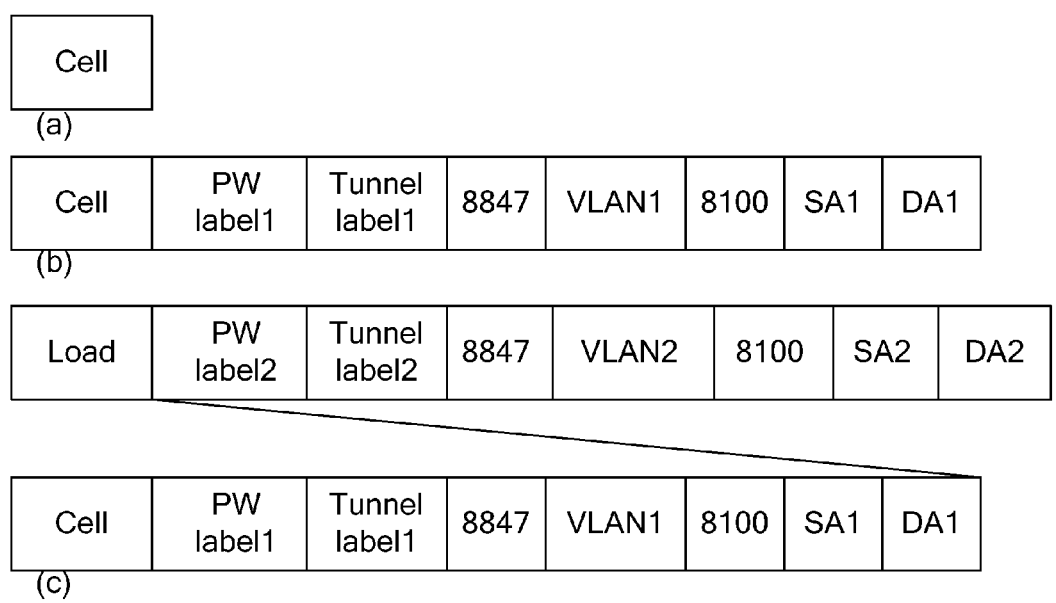
FIG. 4 shows a diagram of data structure before and after encapsulating uplink data according to the present disclosure.

In this step, the data structure before and after data encapsulation is shown as FIG. 4(a) and FIG. 4(b); FIG. 4(a) shows the non-Ethernet data received by the emulation processing module before the encapsulation. As shown in FIG. 4, the non-Ethernet data is represented as a cell; FIG. 4(b) shows a data format after the encapsulation, wherein PW Label1 and Tunnel Label1 respectively represent labels for PW encapsulation and the PWE3 tunnel capsulation, SA1 and DA1 respectively represent the source MAC address and the destination MAC address, and VLAN1 is the VLAN ID corresponding to the PWE3 VE module.

Here, the emulation processing module may include a plurality of PWE3 VE modules that are used for establishing a plurality of inner layer tunnels, therefore different VLANs correspond to different PWE3 VEs; correspondingly, the data processing module may include a plurality of L2VE modules, which have a one-to-one relationship with the PWE3 VE modules. Before implementation of the pseudo wire emulation edge-to-edge access process according to the present disclosure, relations between the PWE3 VE modules and the L2VE modules have been configured by the administrator of the local PE and saved in the local PE.

Step 302: the encapsulated data is encapsulated in an outer layer L2VPN frame format.

Specifically, after receiving the encapsulated data transmitted by the emulation processing module, the data processing module performs a PW encapsulation and an L2VPN tunnel encapsulation on the encapsulated data first, then performs a VLAN encapsulation on the encapsulated data, and makes a destination MAC address and a source MAC address encapsulated in the data.

Wherein the PW is a PW between the local PE and the opposite PE; the L2VPN tunnel is an L2VPN tunnel which is between the local PE and the opposite PE and which bears the PWE3 service between the local user and the opposite user; the VLAN encapsulation means encapsulating VLAN of an exit port on the local PE interface board; the source MAC address is the MAC address of the local PE, the destination MAC address is the MAC address corresponding to the next hop of the outer layer L2VPN service tunnel, namely, the MAC address of the opposite PE.

In this step, the data structure before and after data encapsulation is shown as FIG. 4(b) and FIG. 4(c); FIG. 4(b) shows the encapsulated data transmitted by the emulation processing module, and FIG. 4(c) is the data encapsulated by the data processing module. As shown in FIG. 4, PW Label2 and Tunnel Label2 respectively represent labels for PW encapsulation and L2VPN tunnel capsulation, VLAN2 is the VLAN of the exit port on the local PE interface board, SA2 and DA2 respectively represent the source MAC address and the destination MAC address.

Step 303: the capsulated data is transmitted to the opposite PE.

Specifically, the data processing module transmits the encapsulated data through the port on the PE interface board, and sends the same to the opposite PE through the L2VPN tunnel.

It can be seen from the above steps that, in the present disclosure, the local user and the opposite user have established a PWE3 connection relation between each other in a transparent channel provided by the L2VPN; for multiple groups of different users, the same L2VPN channel is used to transmit data between PEs at two ends, therefore is PWs in the outer layer L2VPN frame format encapsulation have a same value, thus avoiding multiple exchanges of PW labels in the prior art, and further saving a large amount of label space of the PE.

Figure 5:
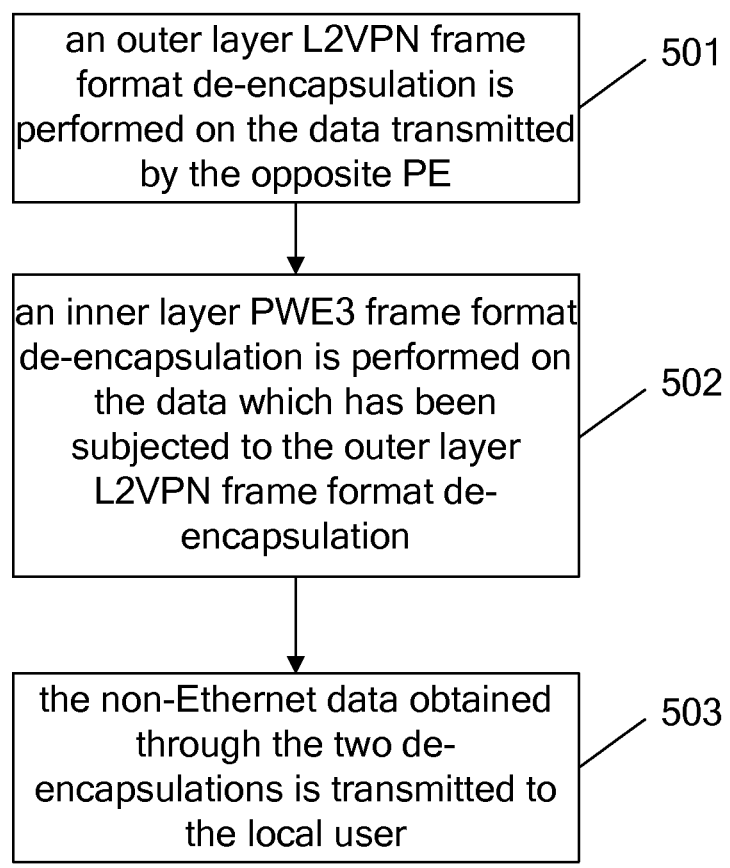
FIG. 5 shows a flow diagram of downlink data forwarding in a method for pseudo wire emulation edge-to-edge access according to the present disclosure.

FIG. 5 shows a flow diagram of downlink data forwarding in a method for pseudo wire emulation edge-to-edge access according to the present disclosure. As shown in FIG. 5, the flow has the following specific implementation steps.

Step 501: an outer layer L2VPN frame format de-encapsulation is performed on the data transmitted by the opposite PE.

Specifically, after receiving the data transmitted by the opposite PE through the L2VPN tunnel, the data processing module in the local PE removes information such as an outer layer PW label, an L2VPN tunnel label, VLAN2, SA2 and DA2, determines a corresponding PWE3 VE module according to VLAN1, and transmits the de-encapsulated data to the emulation processing module in the local PE through the L2VE module and the PWE3 VE module. Here, the data is transmitted to the emulation processing module through the PWE3 VE module.

The data structure before and after the data de-encapsulation is shown as FIG. 6(a) and FIG. 6(b).

Step 502: an inner layer PWE3 frame format de-encapsulation is performed on the data which has been subjected to the outer layer L2VPN frame format de-encapsulation.

Specifically, the emulation processing module removes information such as an inner layer PW label, a PWE3 tunnel label, VLAN1, SA1 and DA1 to obtain the non-Ethernet data finally.

In this step, the data structure before and after data de-encapsulation is shown as FIG. 6(b) and FIG. 6(c).

Step 503: the non-Ethernet data obtained through the two de-encapsulations is transmitted to the local user.

Specifically, the emulation processing module determines the port on the PE interface board according to the inner layer PW label, sends, from the exit port, the is de-encapsulated non-Ethernet data to the local user.

The above description is only preferred embodiments of the present disclosure and is not intended to limit the protection scope of the present disclosure. Any modifications, equivalent replacements and improvements made within the principle of the present disclosure should be included in the protection scope of the present disclosure.

The invention claimed is:

1. An apparatus for Pseudo Wire Emulation Edge-to-Edge (PWE3) access, comprising: an emulation processing module and a data processing module, wherein
the emulation processing module is configured to, after receiving non-Ethernet data transmitted by a local user, perform an inner layer PWE3 frame format encapsulation on the non-Ethernet data, and to transmit the encapsulated data to the data processing module; the emulation processing module is further configured to perform an inner layer PWE3 frame format de-encapsulation on data which is transmitted by the data processing module and which has been subjected to an outer layer L2VPN frame format de-encapsulation, and to transmit the de-encapsulated non-Ethernet data to the local user;
the data processing module is configured to perform the outer layer L2VPN frame format encapsulation on the data which is transmitted by the emulation processing module and which has been subjected to the inner layer PWE3 frame format encapsulation, and to transmit the encapsulated data to an opposite Provider Edge device (PE); the data processing module is further configured to, after receiving the data transmitted by the opposite PE, perform the outer layer L2VPN frame format de-encapsulation on the data, and to transmit the de-encapsulated data to the emulation processing module,
wherein the inner layer PWE3 frame format encapsulation comprises: a first Pseudo Wire (PW) encapsulation, a PWE3 tunnel encapsulation, a first Virtual Local Area Network (VLAN) encapsulation, a first destination MAC address encapsulation and a first source MAC address encapsulation,
wherein the first PW is a PW between the local user and an opposite user, the first destination MAC address is a MAC address of an opposite Customer Edge device (CE), the first source MAC address is a MAC address of a local CE,
wherein the outer layer L2VPN frame format encapsulation comprises a second PW encapsulation, an L2VPN tunnel encapsulation, a second VLAN encapsulation, a second destination MAC address encapsulation and a second source MAC address encapsulation,
wherein the second PW is a PW between a local PE and the opposite PE, the second destination MAC address is a MAC address of the opposite PE, and the second source MAC address is a MAC address of the local PE.

2. The apparatus for pseudo wire emulation edge-to-edge access according to claim 1, wherein the data processing module further comprises:
a Layer 2 Virtual Ethernet Interface (L2VE) module, configured to implement communication between the data processing module and the emulation processing module, through which the data processing module transmits data to the emulation processing module and receives data transmitted by the emulation processing module.

3. The apparatus for pseudo wire emulation edge-to-edge access according to claim 2, wherein the emulation processing module further comprises:
a Pseudo Wire Emulation Edge-to-Edge Virtual Ethernet Interface (PWE3 VE) module, configured to implement communication between the emulation processing module and the data processing module, through which the emulation processing module transmits data to the data processing module and receives data transmitted by the data processing module.

4. The apparatus for pseudo wire emulation edge-to-edge access according to claim 3, wherein the emulation processing module comprises one or more PWE3 VE modules;
correspondingly, the data processing module comprises one or more L2VE modules, which have a one-to-one relationship with the PWE3 VE modules.

5. The apparatus for pseudo wire emulation edge-to-edge access according to claim 1, wherein the emulation processing module further comprises:
a Pseudo Wire Emulation Edge-to-Edge Virtual Ethernet Interface (PWE3 VE) module, configured to implement communication between the emulation processing module and the data processing module, through which the emulation processing module transmits data to the data processing module and receives data transmitted by the data processing module.

6. The apparatus for pseudo wire emulation edge-to-edge access according to claim 5, wherein the emulation processing module comprises one or more PWE3 VE modules;
correspondingly, the data processing module comprises one or more L2VE modules, which have a one-to-one relationship with the PWE3 VE modules.

7. A method for Pseudo Wire Emulation Edge-to-Edge (PWE3) access, comprising:
after receiving non-Ethernet data transmitted by a local user, performing, by a local Provider Edge device (PE), an inner layer PWE3 frame format encapsulation and an outer layer L2VPN frame format encapsulation on the non-Ethernet data in sequence, and then transmitting the encapsulated data to an opposite PE;
after receiving data transmitted by the opposite PE, performing, by the local PE, an outer layer L2VPN frame format de-encapsulation and an inner layer PWE3 frame format de-encapsulation on the date in sequence, and then transmitting, to the local user, the non-Ethernet data obtained after the two de-encapsulations,
wherein the inner layer PWE3 frame format encapsulation comprises: a first Pseudo Wire (PW) encapsulation, a PWE3 tunnel encapsulation, a first Virtual Local Area Network (VLAN) encapsulation, a first destination MAC address encapsulation and a first source MAC address encapsulation,
wherein the first PW is a PW between the local user and an opposite user, the first destination MAC address is a MAC address of an opposite Customer Edge device (CE), the first source MAC address is a MAC address of a local CE, wherein the outer layer L2VPN frame format encapsulation comprises a second PW encapsulation, an L2VPN tunnel encapsulation, a second VLAN encapsulation, a second destination MAC address encapsulation and a second source MAC address encapsulation, wherein the second PW is a PW between a local PE and the opposite PE, the second destination MAC address is a MAC address of the opposite PE, and the second source MAC address is a MAC address of the local PE.

8. The method for pseudo wire emulation edge-to-edge access according to claim 7, wherein the local PE performing the inner layer PWE3 frame format encapsulation comprises:

after receiving the non-Ethernet data transmitted by the local user, performing, by an emulation processing module in the local PE, the first PW encapsulation, the PWE3 tunnel encapsulation, the first VLAN encapsulation on the received non-Ethernet data in sequence, then encapsulating the first destination MAC address and the first source MAC address in the data, and then transmitting the encapsulated data to a data processing module in the local PE through a PWE3 VE module in the emulation processing module, wherein the data processing module receives data through an L2VE module configured by itself.

9. The method for pseudo wire emulation edge-to-edge access according to claim 8, wherein performing the outer layer L2VPN frame format encapsulation on the non-Ethernet data which has been subjected to inner layer PWE3 frame format encapsulation comprises:

after receiving the encapsulated data transmitted by the emulation processing module, performing, by the data processing module in the local PE, the second PW encapsulation, the L2VPN tunnel encapsulation and the second VLAN encapsulation in sequence, and encapsulating the second destination MAC address and the second source MAC address in the data.

10. The method for pseudo wire emulation edge-to-edge access according to claim 7, wherein performing the outer layer L2VPN frame format encapsulation on the non-Ethernet data which has been subjected to inner layer PWE3 frame format encapsulation comprises:

after receiving the encapsulated data transmitted by the emulation processing module, performing, by the data processing module in the local PE, the second PW encapsulation, the L2VPN tunnel encapsulation and the second VLAN encapsulation in sequence, and encapsulating the second destination MAC address and the second source MAC address in the data.

* * * * *